United States Patent

Putsch et al.

[11] 4,054,966
[45] Oct. 25, 1977

[54] LOCKABLE, ADJUSTABLE HINGE FOR MOTOR-VEHICLE SEAT

[75] Inventors: Ulrich Putsch, Rockenhausen; Gerd Klingelhöfer, Remscheid, both of Germany

[73] Assignee: Keiper K.G., Remscheid-Hasten, Germany

[21] Appl. No.: 662,846

[22] Filed: Mar. 1, 1976

[30] Foreign Application Priority Data

Mar. 1, 1975   Germany .............................. 2509074

[51] Int. Cl.² ..................... E05D 11/10; A47C 1/025; B60N 1/06
[52] U.S. Cl. ........................ 16/143; 74/380; 74/417; 74/800; 297/362; 297/379
[58] Field of Search .............. 297/361, 362, 373, 374, 297/378, 379, 355, 354; 16/139, 140, 143, 145–147; 74/380, 385, 417, 800

[56] References Cited

U.S. PATENT DOCUMENTS 3,401,979   9/1968   Putsch ................................ 297/362

FOREIGN PATENT DOCUMENTS 770,970   11/1967   Canada .................................. 297/379
1,248,251   8/1967   Germany ............................. 297/361
2,166,311   11/1973   Germany .............................. 297/362
1,002,810   9/1965   United Kingdom ................. 297/361

Primary Examiner—Roy D. Frazier
Assistant Examiner—William E. Lyddane
Attorney, Agent, or Firm—Michael J. Striker

[57] ABSTRACT

An adjustably lockable hinge for motor-vehicle seats comprises first and second hinge elements and a pintle between these elements defining a pivot axis therefor. A first arcuate row of equispaced first abutments is carried on the first element spaced from the main axis and facing axially in one direction. A body carrying a second arcuate row of equispaced second abutments facing axially from the body opposite to the one direction and axially aligned with the first row is rotationally linked to the second element. The abutments of the second row are spaced apart by a predetermined distance different from the spacing between the first elements, so that only a limited number of the second abutments can mesh at one time with the first abutments. An adjustment device rotatable about the axis relative to the elements is engageable with the body for precession of the second row on the first row. These rows may be annular arrays of gear-type teeth and the body may be a ring around the hinge pintle.

13 Claims, 9 Drawing Figures

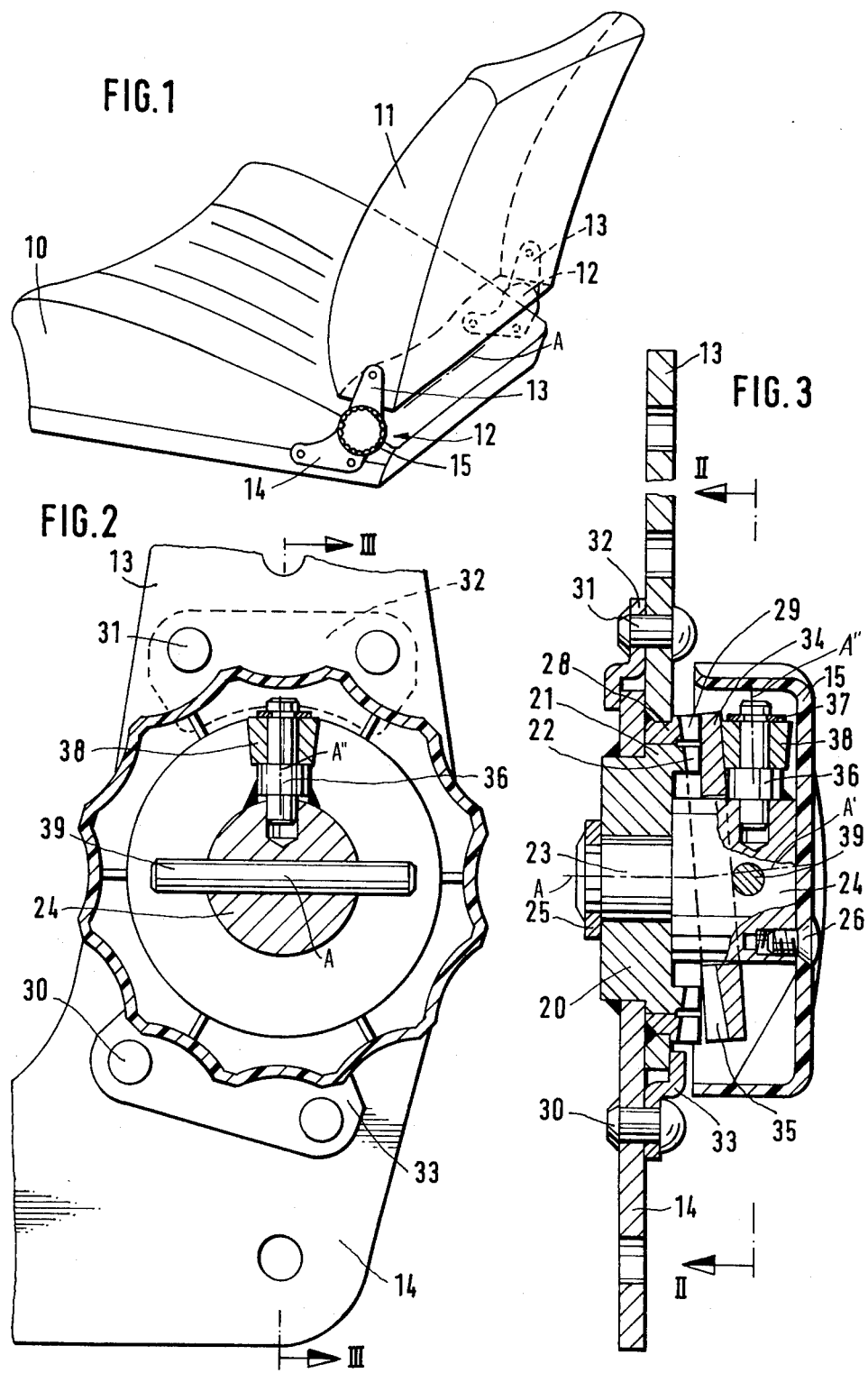

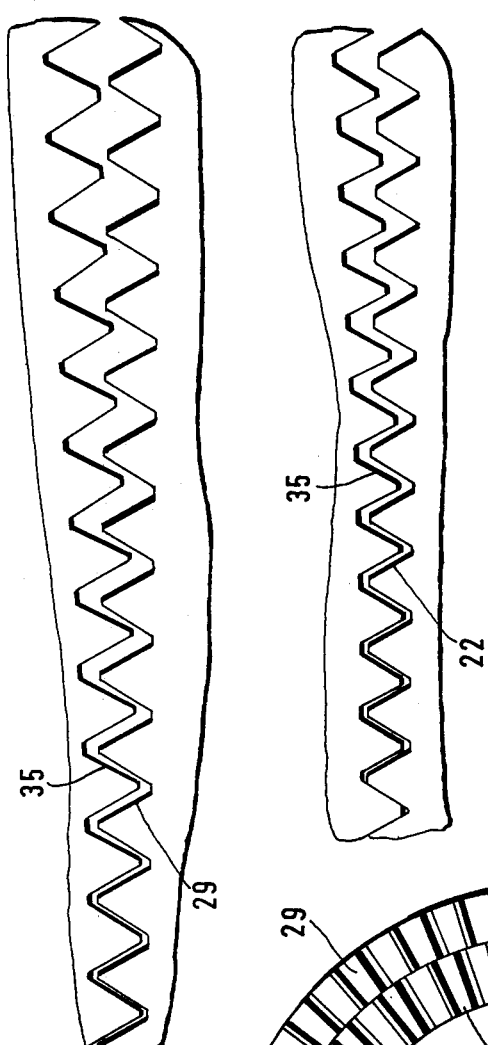
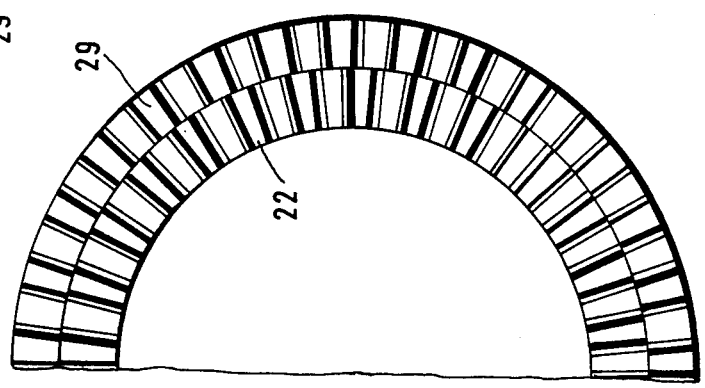

LOCKABLE, ADJUSTABLE HINGE FOR MOTOR-VEHICLE SEAT

BACKGROUND OF THE INVENTION

This application relates to a lockably adjustable hinge. More particularly, this invention concerns such a hinge useable between a back and seat part of a seat for a vehicle.

It is conventional to provide bucket seats in the front sitting places of an automotive vehicle whose back parts and seat parts are hinged relative to one another about a horizontal axis. Means is provided for locking the back relative to the seat in any of a plurality of angularly offset positions. Thus the passenger or driver may adjust the inclination of his seat back for the position most comfortable to him or her.

It has been suggested in German Pat. No. 1,150,586 to provide a plurality of angularly equispaced axially extending teeth on one of the hinge elements centered on the hinge pintle and another such array on the other hinge element. Means is provided, usually operable by means of a screw-type adjustment knob, to displace these two arrays into and out of a mesh with each other. When meshed they lock the two elements, and therefore the seat part and back part of the seat, relative to one another. When out of mesh the back can be pivoted relative to the seat into the desired position where it can be tightened up and locked in place. The disadvantage of this system that the back part must be completely unloaded in order to allow the hinge lock to be unfastened and the seat to be swivelled. This makes it difficult for a person to find other than by a trial-and-error process the position that suits him or her best.

Another arrangement described in German Offenlegungsschrift No. 2,138,972 forms each of the hinge elements with a respective annular array of angularly equispaced holes. These arrays are centered on the pintle axis and axially in line, but the angular spacing of the holes of one array is different from that of the other array so that pins can be fitted through two aligned holes in just about any position of the back relative to the seat. Such an arrangement suffers from the same disadvantages of the arrangement described immediately above, and mainly that the seat back must be completely unloaded for the user to adjust it.

In German Pat. No. 1,297,496 an arrangement is described wherein one of the hinge elements of the seat is formed with an internal gear and the other element is formed with an external gear mounted on an eccentric pin and meshable with the internal gear. Rotation of the eccentric pin causes the external gear to travel around within the internal gear and, therefore, change the relative positions of the two elements. In such a system it is necessary to provide extremely robust and hard-to-operate arresting means for this external gear. Even so the adjustment obtained is relative coarse.

Finally, it has been suggested in German Pat. No. 1,291,570 to provide on each of the hinge elements a respective internal gear centered on the pintle axis. These two gears are of different diameters and respective external gears carried on a common eccentric shaft mesh with them so that rotation of these shafts will angularly offset the two hinge elements. This system, although it allows for a fine adjustment of the seat while loaded, is relatively complicated, and, therefore, expensive. At the same time it needs separate and heavy-duty locking means to prevent rotation of the external gears once the desired position is set.

SUMMARY OF THE INVENTION

It is therefore an object of the present invention to provide an improved hinge.

Another object is the provision of an improved lockingly adjustable hinge useable between the back part and seat part of a vehicular seat.

Yet another object is the provision of such a hinge which allows the back to be pivoted relative to the seat even when a person is leaning against the back.

A further object is the provision of a hinge which is relatively simple and inexpensive, yet which has a long service life and can provide a fine seat-inclination adjustment.

These objects are attained according to the present invention in an adjustably lockable hinge having first and second adjacent hinge elements interconnected by a pintle defining a pivot axis for these elements. A first arcuate row of equispaced first teeth is carried on the first element spaced from the axis and extending axially in one direction. A body carrying a second arcuate row of equispaced second teeth extending axially from the body opposite said one direction and axially aligned with the first row is rotationally linked to the second element. The teeth of the second row are spaced apart by a predetermined distance different from the spacing between the first teeth so that only a limited number of the second teeth can mesh at one time with the first teeth. Means is provided which is rotatable about the axis relative to the elements and engageable with the body for precession of the second row on the first row.

According to further features of this invention that body is a disk and the two rows are circularly annular with the row on the first element centered on the pintle axis and the row on the body being centered on an axis of the body that can nutate with the pintle axis during precession of the disk on the first element.

With the system according to this invention it is possible to very finely and precisely adjust the inclination of the back part of the seat. Furthermore, since the two rows of teeth always remain in mesh with one another, this adjustment can take place even when the seat is being stressed in one direction or the other. The device is automatically self-locking as the angularly effective forces are transformed by the teeth into axially directed stresses that are easily taken up in the mechanism.

Instead of teeth is it possible to use other formations. Thus abutments may be used constituted as a row of short frustoconical or axially tapered pegs or pins on the one side and a succession of holes on the other side, once again the abutments in each row being equispaced, but the spacing being different from one row to the other.

It is possible in accordance with the present invention to rotationally link the body to the second element by providing a universal-joint or cardan-type connection between the two with the one axle of the cardan joint passing through a diametrical hole in the pintle which itself is welded or otherwise secured to the second element. An adjustment knob rotatable on the pintle has a radially extending pin on which is carried a roller engageable with the back of the nutating disk in order to press the corresponding opposite portion of its periphery into mesh with the corresponding teeth of the other row.

It is also possible to provide in accordance with this invention an oblique camming surface lying in a plane inclined to the pintle axis and bearing against the flat backside of the nutating disk. This camming body is carried on an adjustment knob once again rotatable on the pintle of the hinge. In such an arrangement the disk may be a simple ring formed on one axial face with the respective array of teeth.

It is also possible according to the present invention to provide on the second element an annular array of teeth lying radially within or without the annular array of teeth on the first element. The array on the second element has the same number of teeth as the body so that this body is rotationally linked to the second element by being meshed with the array of teeth on the second element. A knob rotatable on the pintle or with the pintle carries a radially extending pin on which is provided a roller. In addition this knob is provided with a fulcrum for the disk, preferably in the form of a diametrically extending fulcrum pin perpendicular to a plane defined by the pintle axis and the axis of the roller-carrying pin.

In accordance with another feature of this invention means is provided for axially displacing the pintle between a pair of axially-spaced positions. Such an arrangement allows the two rows of abutments to be moved completely out of engagement with one another for fast coarse adjustment of the seat position, as for example a reclining-seat set up. The seat is usually provided with two such hinges connected in accordance with this invention by a common rod constituting both pintles and interconnecting both adjusting means so that the user need merely turn the adjustment knob at one side or the other of the seat in order to adjust both hinges to the same extent.

With the system according to the present invention it is possible for the seat position to be adjusted very finely, as the one array of teeth may have only one tooth more than the other so that a 360° precision will only produce a small angular offset. Furthermore the nature of the arrangement is such that complicated locking means are not necessary to hold the teeth in the position once the desired inclination is attained, as the forces within the arrangement work against one another so that a complicated clamping arrangement is not necessary. In addition the arrangement can be made extremely compact and at low cost so that at no additional expense an adjustable seat can be provided where hitherto it would have been too expensive.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 1 is a perspective view illustrating a vehicular seat in accordance with the present invention;

FIG. 2 is a vertical section through one of the hinges shown in FIG. 1;

FIG. 3 is a section taken along line III—III of FIG. 2, line II—II in FIG. 3 being the section line for FIG. 2;

FIG. 8 is a developed view showing operation of the system in accordance with this invention; and FIG. 9 is an end view of two of the teeth arrays of the arrangement of FIGS. 2 and 3.

DESCRIPTION OF THE PREFERRED EMBODIMENTS

Figure 4:
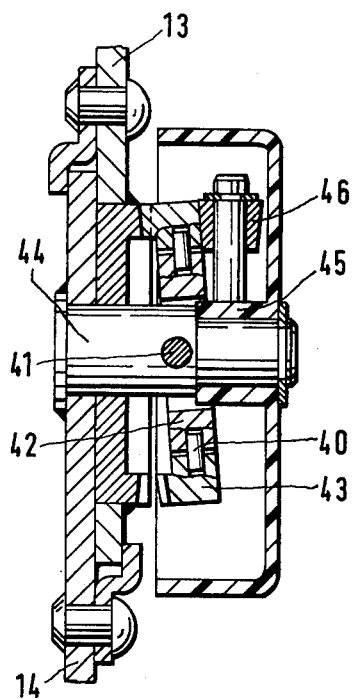
FIGS. 4 and 5 are axial sections through details of two other hinges in accordance with this invention.

As is shown in FIG. 1 a seat for an automotive vehicle has a seat part 10 and a back part 11 interconnected by a pair of hinges 12. Each hinge comprises a hinge element 13 secured to the back part 11 and a hinge element 14 secured to the seat part. An adjustement knob 15 formed with a fluted edge allows these hinges to be adjusted for different inclinations of the back part 11 relative to the front part 10 about a pintle axis A.

As shown in FIGS. 2 and 3 the hinge element 13 is welded to a cylindrical stepped sleeve 20 having an axially projecting crown 21 formed with 29 teeth 22. Rotatable about the axis A within the sleeve 20 is the shank 23 of a pintle 24 which is prevented from axially moving in the sleeve 20 by a washer 25 held under the peened-over end of the shank 23.

The element 13 is welded to a ring 28 centered on the axis A like the sleeve 20 and rim 21 and itself formed with an array of 30 teeth 29 spaced radially just outside of the array of teeth 22. Z-section and arcuate metal clips 32 and 33 are secured via rivets 31 and 30, respectively, to the elements 13 and 14 and overreach the other elements so as to insure that the two elements 13 and 14 will pivot about the axis A relative to one another but will be non-displaceable relative to one another along this axis.

An annular disk or ring 34 constituting a body is formed with an array of 29 teeth 35 which have sufficient axial length to overlap the array of teeth 22 and 29. This ring 34 is centered on its own precession axis A' which intersects the axis A and fits around the pintle 24. In addition, the ring 34 can rock on a pin 39 extending completely through the pintle 24 and out of both sides thereof and extending perpendicular to the axis A of the pintle 24.

A radially extending pin 36 is press-fitted in the pintle 24 and has an axis A" which forms with the axis A a plane perpendicular to the axis of the pin 39. This pin 36 is provided with a frustoconical pusher roller 38 secured in place by means of a snap ring 37 and riding against the back side of the body 34. The tooth 35 of the ring 34 directly opposite the location against which the roller 38 presses will be pressed between two of the teeth 22 of the sleeve 20 and between two of the teeth 29 of the ring 28. The synthetic-resin fluted cap 15 is secured by screws 26 to the pintle 24.

With reference to FIGS. 8 and 9 it can be seen how as the pintle 24 is rotated by means of the adjustment knob 15 that the ring 34 will precess around on the arrays of teeth 22 and 29, the teeth 22 constituting a means rotationally linking the ring or body 34 with the hinge element 14. Since the number of teeth 35 is the same as the number of teeth 22 this will cause the teeth 35 to push the teeth 29 angularly to one side as they mesh. Since the one array has only one-thirtieth more teeth than the other a complete 360° precession of ring 34 will nearly displace the element 13 relative to the element 14 by an angle of 12°, equal to one-thirtieth of 360°. Thus, an extremely fine adjustment is obtainable.

The arrangement shown in FIG. 4 has a pintle 44 welded to the element 14 and provided with a diametrically through-going pivot pin 41 received at its opposite projecting ends in a central ring 42. A pair of pins 40 extending along a common axis at a right angle to the pin 41 carry an outer ring or body 43 formed with thirty teeth meshing with similar teeth on the element 14. The adjustment knob 45 is provided with a pusher roller 46 identical in function to the roller 38 for precession of the outer ring 43. The pins 40 and 41 therefore form a universal or cardan joint, between the ring 43 and the pintle 44, eliminating the need for the fulcrum. The pins 40, 41 and the ring 42 constituting a means rotationally linking the ring or body 43 with the hinge element 14.

Figure 5:
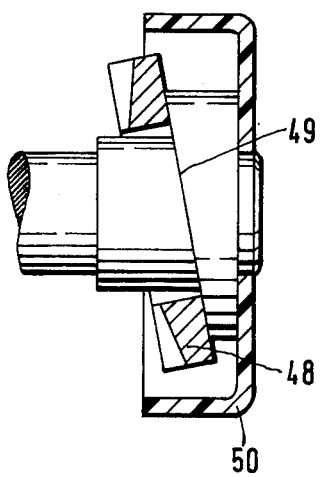

It is also possible in accordance with this invention to provide the adjustment knob 50 as shown in FIG. 5 with a planar and oblique camming surface 49 that engages against the back face of a pusher or body 48 identical to the ring 34. Since surface 49 engages against the ring 48 all around the pintle the necessity for a fulcrum pin or cardan joint is eliminated.

Figure 7:
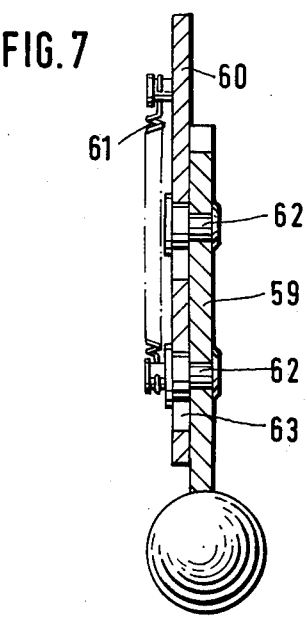
FIG. 7 is a section taken along line VII—VII of FIG. 6.
Figure 6:
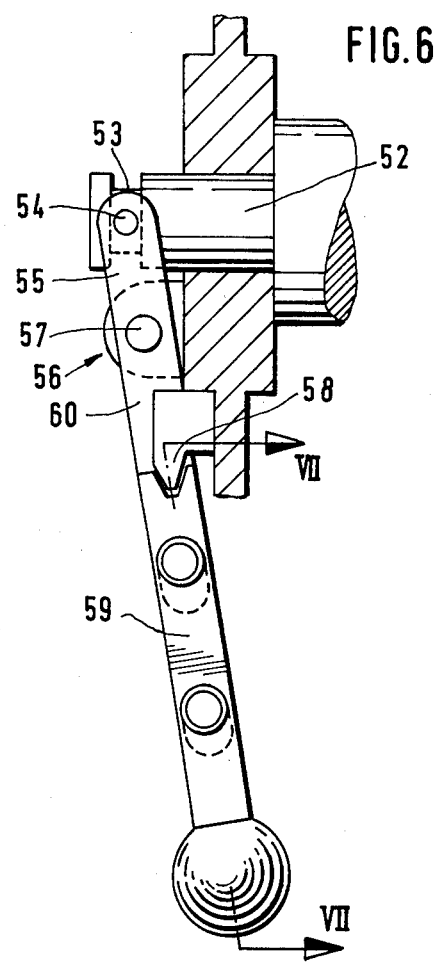
FIG. 6 is an axial section through a fast-adjust arrangement in accordance with the present invention.

FIGS. 6 and 7 show an arrangement useable for fast adjustment of the seat. Here a pintle such as shown at 24 in FIGS. 2 and 3 is formed with an extension 52 having at its end a circumferentialgroove 53 in which are received a pair of pins 54 on a fork end 55 of a lever 60. This lever arrangement 56 is fixedly pivoted at 57 and is lockable on a pawl 58 which is also fixed. A bar 59 is provided with rivets 62 engaging through slots 63 in the rivets 62. A spring 61 normally pulls the bar 59 in a direction tending to cause it to engage over the pawl 58 and lock the lever 60 in the illustrated position. When this bar 59 is, however, pulled away from the paw 58 the end 52 of the pintle may be slipped in so as to bring the abutments such as shown in FIG. 3 at 22, 29 and 35 on the two elements out of engagement with one another and allow the seat back to be rapidly moved into a new position. Thereafter the arrangement can be snapped back and a fine adjustment can be effected by means of the knob 15, 45 or 50.

It will be understood that each of the elememts described above, or two or more together, may also find a useful application in other types of constructions differing from the types described above.

While the invention has been illustrated and described as embodied in a motor-vehicle seat hinge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustably lockable hinge comprising:
   first and second adjacent hinge elements;
   a pintle between said elements defining a pivot axis therefor;
   a first arcuate row of equispaced first abutments fixed on said first element spaced from and centered on said axis and facing axially in one direction;
   a body having a second arcuate row of equispaced second abutments facing axially from said body opposite to said one direction and axially aligned with said first row, said abutments of said second row being centered on a precession axis intersecting said pivot axis and being spaced apart by a distance different from the spacing between said first abutments, whereby said rows can precess and only a limited number of said second abutments can mesh at one time with said first abutments;
   means rotationally linking said body with said second element to permit for joint angular movement about said pivot axis; and
   means rotatable about said pivot axis relative to said elements and engageable with said body to cause said second abutments to roll on said first abutments to produce precession of said second row on said first row.

2. The hinge defined in claim 1 wherein said first and second row are each circularly annular and centered respectively on said pivot and precession axes and each of said abutments is an axially extending tooth, one of said rows having at least one more tooth than the other row.

3. The hinge defined in claim 2 wherein said body is a flat disk having a back face turned axially away from said first element and a front face turned axially toward said first element and carrying said second row of teeth, said means rotatable about said axis including a pusher offset from said pivot axis and engageable against said back face.

4. The hinge defined in claim 3 wherein said means rotationally linking includes a cardan joint between said body and said second element.

5. The hinge defined in claim 4 wherein said disk is annular and said cardan joint includes a first member radially within said disk, a first pivot pin between said second element and said first member defining therefor a first swivel axis perpendicular to said pivot axis and at least one second pin generally perpendicular to said first pin between said first member and said disk and defining therefore a second swivel axis generally perpendicular to said first swivel axis.

6. The hinge defined in claim 5 wherein said pusher is a roller engageable with said back face and orbitable about said pivot axis.

7. The hinge difined in claim 3 wherein said pusher is a member having a surface turned toward said second element and lying against said back face, said member being rotatable about said pivot axis and said surface being inclined to said pivot axis.

8. The hinge defined in claim 3 wherein said means rotationally linking includes a third circularly annular row of third teeth carried on said second element and centered on said pivot axis radially inside said first row, said third row having the same number of teeth as said second row and said first and third rows being radially aligned, whereby said second row of teeth can mesh with said third row and said first row simultaneously.

9. The hinge defined in claim 8 wherein said pusher is a roller rotatable about a pusher axis perpendicular to said pivot axis, said means rotatable about said pivot axis including a support carrying said roller and provided with a fulcrum for said disk.

10. The hinge defined in claim 9 wherein said disk is annular and surrounds said support, said fulcrum being a pin having an axis perpendicular to said pivot and pusher axes and passing through said support with ends engaging said back face.

11. The hinge defined in claim 1, further comprising quick-adjust means for axially displacing at least one of said rows between a free position wherein said first and second elements may pivot freely relative to each other about the respective pivot and precession axes and a locked position wherein such pivoting is impossible.

12. The hinge defined in claim 11 wherein said quick-adjust means includes a rod centered on and defining said pivot axis, said body being carried on said rod, whereby displacement of said rod can disengage said abutments.

13. The hinge defined in claim 12 wherein said quick-adjust means includes a lever pivoted about a lever axis offset from said pivot axis, said lever having one end linked to said rod and another end, and means engageable with said other end for preventing pivoting of said lever about said lever axis.

* * * * *